Oct. 30, 1962  B. WALKER  3,061,028
MOTOR VEHICLE LIFTING AND TRAVERSING DEVICE
Filed Dec. 2, 1957  5 Sheets-Sheet 1

INVENTOR.
Brooks Walker

Oct. 30, 1962    B. WALKER    3,061,028
MOTOR VEHICLE LIFTING AND TRAVERSING DEVICE
Filed Dec. 2, 1957    5 Sheets-Sheet 2
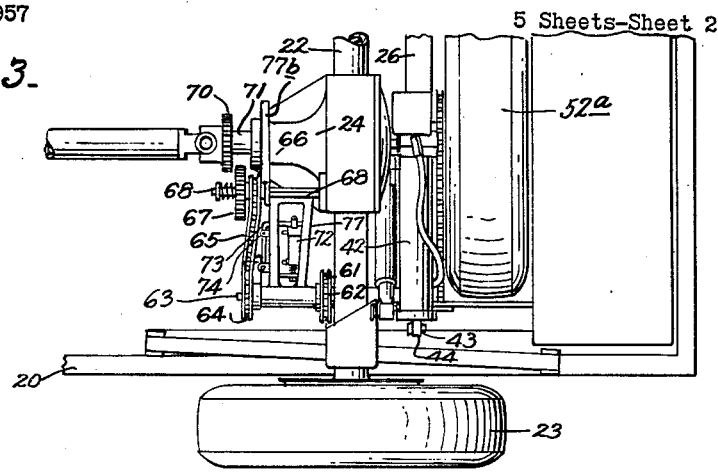
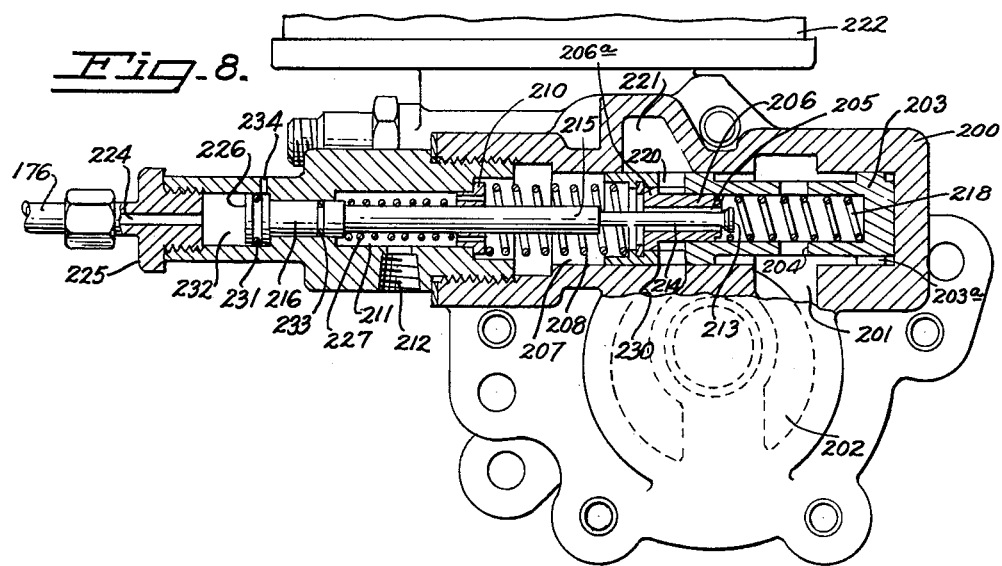
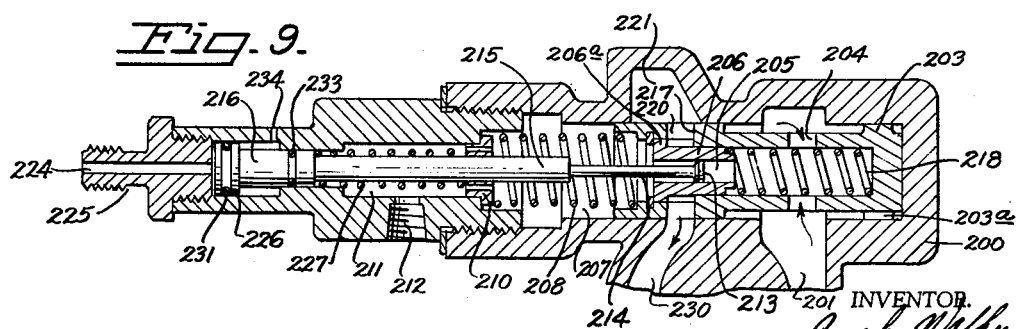
INVENTOR.
Brooks Walker

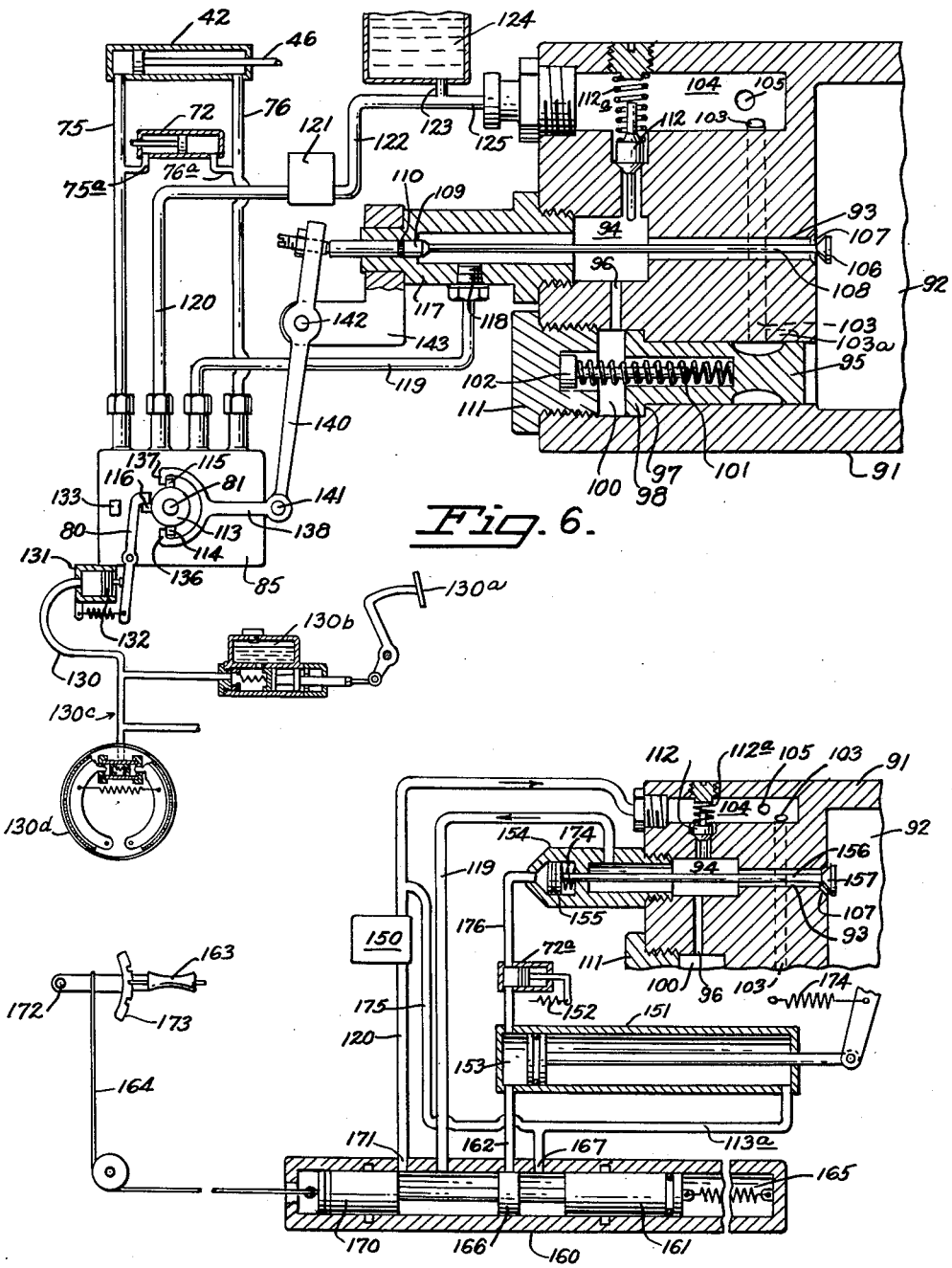

United States Patent Office 3,061,028
Patented Oct. 30, 1962

3,061,028
MOTOR VEHICLE LIFTING AND TRAVERSING
DEVICE
Brooks Walker, 1280 Columbus Ave.,
San Francisco 4, Calif.
Filed Dec. 2, 1957, Ser. No. 700,216
16 Claims. (Cl. 180—1)

This invention pertains to a vehicle lifting and traversing or vehicle turning device. This application is a continuation-in-part of application Serial No. 384,633, filed October 7, 1953, now abandoned.

As in some of my earlier inventions in this general field, the rear of the vehicle is raised by hydraulic power obtained from an engine driven pump, such as the pump normally used for power steering; when raised, the car is moved to the right or left by the same low and reverse gears used in normal operation of the car, and its movement is stopped by the same hand or foot brake normally used to stop the car.

A feature of the present invention is the provision of a single hook to lift both rear wheels, the lifting mechanism being mechanically connected to the hook so as to operate the hook and to lift the rear of the vehicle in a manner that gets some spring support for the vehicle when it is supported on the lifting and turning mechanism.

Another feature of the invention is means for preventing the lifting hook from hooking the axle when it is desired to change either rear tire and at the same time to provide a higher lift of the vehicle body, so that the elevated wheels will fully extend the spring or other resilient means for supporting the vehicle body and thereby the rear tires will clear the rear fenders for removal of the rear tires or wheels and replacement with the spare tire or spare wheel. At other times, when the tires are not being changed, the vehicle is lifted off its rear wheels with a minimum of extension of the springs.

A mechanical linkage without cables carries the spare wheel by the vehicle body as spring weight and operates when lowered to lift the rear of the vehicle largely through the rear resilient means that normally support the rear of the vehicle on the rear wheels. A mechanical latch in addition to the hydraulic action, holds the spare wheel in its inactive raised position.

Another feature of the invention, in connection with use of the pump normally used for power steering to raise the car on the spare wheel, is the provision of means to increase the discharge of the pump at the same engine speed, by providing a shift in the flow control valve to give greater flow at the same engine speed when raising or lowering the car on the mechanism than when operating the normal power steering.

Another feature of the invention is to provide a lock out so that the mechanism cannot be lowered except when the foot brake is fully applied.

Another feature is to provide a rotational drive for the spare wheel from a power takeoff at the rear pinion shaft or rear universal joint, where the differential is on the rear axle, and engaging and disengaging said drive by the same fluid pressure that raises and lowers the vehicle on the spare tire.

Other features of the invention will be more particularly pointed out in the accompanying specification and claims.

I have illustrated my invention in the accompanying drawings, in which:

FIG. 3 is a bottom plan view of the apparatus of FIG. 1, with part of the vehicle cut away, showing the mechanism for driving the spare wheel from the vehicle drive shaft.

FIG. 6 is a partly diagrammatic view in elevation and in section of a hydraulic circuit that may be used in the control portion of the invention.

FIG. 7 is a view partly in section, and partly diagrammatic of a modified form of part of the hydraulic circuit shown in FIG. 6.

FIG. 8 is a view in side elevation, partly in section and partly diagrammatic, showing a portion of an alternate type of hydraulic control.

FIG. 9 is a view similar to the upper portion of FIG. 8 but with the control valves shown in another position.

Figures 10, 11:
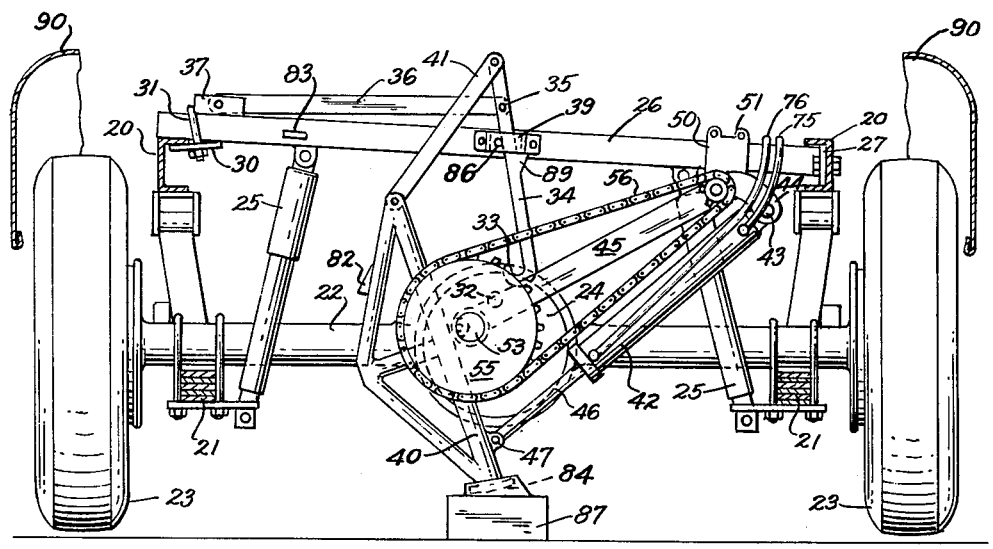
FIG. 10 is a view similar to FIGS. 1 and 2 showing the vehicle raised by my device into a position suitable for changing one of the rear tires.
FIG. 11 is a side elevational view of the vehicle, with portions broken away to show the locations of some parts used in my invention.

In FIGS. 1–5 I have shown a vehicle frame 20 resiliently supported by springs 21 on a rear axle 22 and rear wheels 23, the rear axle 22 having a differential housing 24 and being additionally connected to the frame 20 by shock absorbers 25. In FIG. 11, I show that the vehicle has a driver's compartment 20$^a$ and a power plant or engine 20$^b$.

Figure 1:
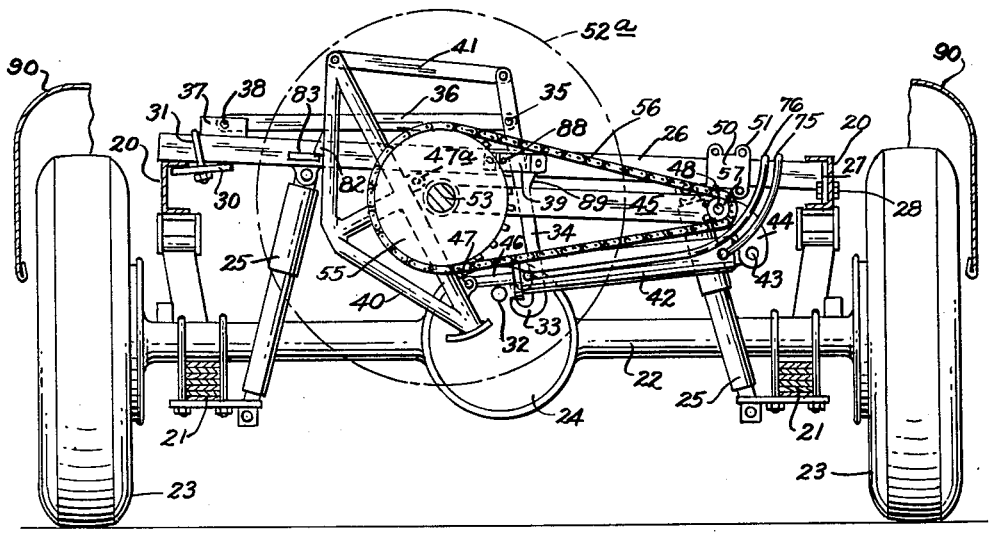
FIG. 1 is a view in rear elevation, partly cut away, of a vehicle elevating and traversing system embodying the principles of my invention, the vehicle being shown in its normal, non-elevated position.
Figure 2:
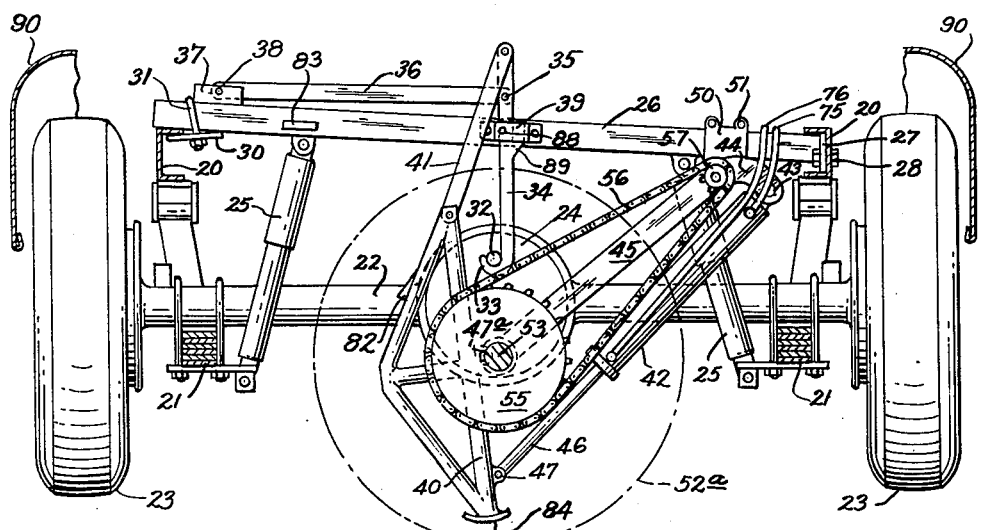
FIG. 2 is similar to FIG. 1 showing the vehicle in its elevated position.
Figure 4:
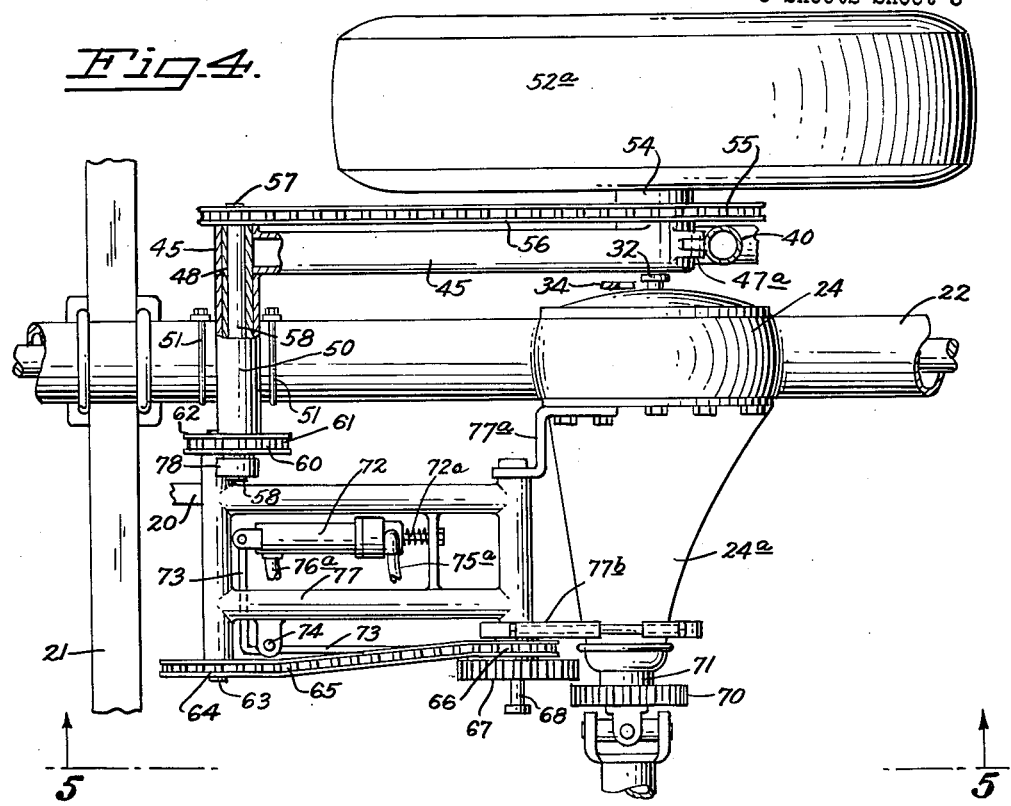
FIG. 4 is a fragmentary plan view of the rotating drive for the spare, partly cut away and shown on an enlarged scale.
Figure 5:
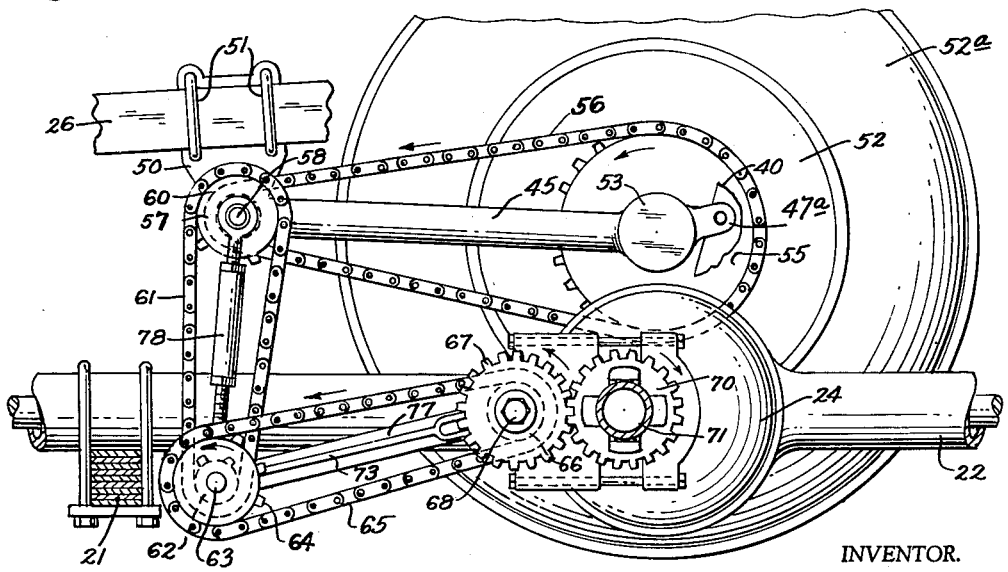
FIG. 5 is a view in section taken along the line 5—5 in FIG. 4.

In my invention, the frame 20 rigidly supports an inclined cross shaft or tube 26 or some equivalent member. In FIGS. 1 and 2 the right end of the tube 20 is shown secured to a plate 27 that is bolted to the inside of the frame 20 by a bolt 28, and the left side of the tube 26 is connected to the frame 20 by a plate 30 and a U bolt 31.

A boss 32 secured to the differential housing 24 is adapted to be engaged (FIG. 2) and disengaged (FIG. 1) by a hook 33 at the end of a pivoted arm 34. The hooked arm 34 either, as seen in FIGS. 1 and 10, completely disengages the boss 32 in an inactive position or, as shown in FIG. 2, engages the boss 32 to lift the rear wheels 23 substantially with the vehicle frame 20.

The hooked arm 34 is pivotally attached by a bolt 35 to a radius rod 36 for guiding its movement but not for its support. The other end of the radius rod 36 is, in turn, pivoted to a bracket 37 by a bolt or other pivot means 38, and the bracket 37 is secured to the rigid tube 26 by welding or by other suitable means. A guide bracket 39 may also be attached to the tube 26 to provide a guide limiting sidewise play of hooked arm 34.

The hooked arm 34 is swung on its pivots in accordance with the rotation of a rigid truss-like arm or walking beam arm 40, and by the movement thereby of a toggle link 41 which is pivotally connected at its opposite ends to the arm 40 and the hooked arm 34. The arm 40 is moved by a hydraulic cylinder 42 that is pivoted by a bolt 43 to a bracket 44 on a main arm 45, the piston rod 46 of the cylinder 42 being pivoted to the arm 40 by a bolt 47. Movement of the piston rod 46 swings the arm 40 about its pivot 47$^a$, which is also on the main arm 45.

The main arm 45 (see FIGS. 4 and 5) is itself pivotally supported by a hollow crank or spindle 48 rotatably mounted in the bearing of a bracket 50, which is secured to the tube 26 by U bolts 51, or by welding or other suitable means.

Thus, the member 26 is rigid with the frame 20 and pivotally supports the main arm 45, while the main arm 45 pivotally supports the arm 40. The cylinder 42 pivots on the main arm 45, and its piston pivots on the arm 40. The hooked arm 34 is supported by the arm 40 through the toggle link 41 for movement guided by the radius rod 36, which pivots on the member 26.

A spare wheel 52 is pivotally mounted on a spindle 53 which is mounted on the main arm 45. It supports a spare tire 52ª that preferably is inflated to higher than the normal pressure used in the rear tires 23, in order to limit deflection of the tire 52ª to normal rear tire deflection when the rear of the car is lifted thereon.

The wheel 52 is driven by the vehicle transmission, in one direction by low gear and in the other direction by reverse gear. For this purpose, the wheel hub 54 carries a sprocket 55 which is driven through a chain 56 by a sprocket 57. The sprocket 57 is mounted on the rear end of a shaft 58 that passes through the hollow spindle 48, which is supported in bearings mounted in the bracket 50 and pivotally supports the main arm 55. A sprocket 60 on the forward end of the shaft 58 is driven through a vertical chain 61 (FIGS. 4 and 5) by a sprocket 62. The sprocket 62 is mounted on one end of a shaft 63. A sprocket 64 on the other end of the shaft 63 is driven through a chain 65 by a united sprocket 66 and gear 67 rotatably and slidably mounted on a shaft 68. Thus, rotation of the gear 67 drives the series of chains and sprockets to rotate the rear wheel 52.

The gear 67 can be meshed with and unmeshed from a gear 70 mounted on the rear universal flange of a pinion shaft 71, which rotates the rear differential. To shift the gear 67 in and out of engagement with gear 70, a piston in a cylinder 72 (FIG. 4) operates a bell-crank shift fork 73, which is pivoted at 74 (see FIGS. 3, 4, and 5). The shift fork 73 causes the gear 67 to engage gear 70 at the time when the hydraulic pressure lifts the car, because when the hydraulic pressure is applied through a line 75 to the right hand end of the cylinder 42 as viewed in FIGS. 1 and 2 with resultant extension of the piston rod 46, the same pressure is applied to the cylinder 72 through a line 75ª to rotate the bell-crank shift fork 73 counter-clockwise, as viewed in FIG. 3 or clockwise as viewed in FIG. 4. On the other hand, when lines 76 and 76ª are pressurized, the piston rod 46 is retracted and the spare tire 52 is retracted, and the bell crank shift fork 73 is then swung (clockwise as viewed in FIG. 3, counter-clockwise as viewed in FIG. 4) by the outward movement of the piston rod of the cylinder 72, to disengage the gear 67 from the gear 70, which does not shift. A frame 77, which is pivoted to brackets 77ª and 77ᵇ on the differential housing 24 and the pinion housing 24a, respectively, by the shaft 68 (FIGS. 3 and 4), is attached to the vehicle frame 20 by a radius rod 78 (FIG. 5), which is preferably pivoted at its lower end at a point near the shaft 63 and at its upper end near the center line of the shaft 58, so that the vertical chain 61 is maintained in adjustment when the shaft 68 moves up and down with the differential housing 24 relative to the vehicle frame 20.

The mechanism operates as follows: When the vehicle is stopped, the foot brake is depressed firmly to unlock a latch 80, shown in FIG. 6; then a shaft 81 rotates clockwise, as is explained later in detail, to admit fluid pressure to the upper end of the cylinder 42 through the tube 75. Thus, until the brake is set, the vehicle-lifting device will not operate. This is an important safety factor. The fluid admitted to the cylinder 42 causes the piston rod 46 to move out from the cylinder 42, rotating the arm 40 clockwise about its pivot 47ª on the main arm 45. The first part of this clockwise movement of the arm 40 unlocks a hold-up catch 82 and 83 by moving the link 41 to the right, as viewed in FIGS. 1 and 2. This allows the hooked arm 34 to drop to where the radius rod 36 touches the bracket 39 and forces the hook 33 under and against the boss 32.

Further motion of the piston rod 46 rotates the arm 40 to move the toggle formed by the upper portion of the arm 40 and the link 41 from the retracted position near that shown in FIG. 1 to the almost straightened position shown in FIG. 2. During the lowering operation the cylinder 42 and the piston rod 46 move apart to force the arm 40 to rotate clockwise about its pivot 47ª. The top part of the arm 40 forms a toggle with the link 41 connected to the top of the hooked arm 40. The radius rod 36 restrains the hooked arm 34 from moving to the right and causes the hook 33 to engage the axle boss 32. Then, as the hooked arm 34 is free to move up and down in the guide 39, the car is lifted through its axle 22 while the spare wheel 52 is being swung down to its car supporting position by the main arm 45.

By means of the structure just described, the vehicle does not have to be lifted the extra distance heretofore required when frame-to-axle hooks are employed in devices where the lifting and traversing device is carried as sprung weight when inactive. The construction of this invention also provides a means for carrying the lifting and traversing device as sprung weight when inactive but also effects most of the lift through the rear springs 21 to provide a sprung ride when on the parking wheel 52 without using cables as has been done in the art.

The hook 33 can move up and down freely through the guide 39 when in the lifted position, as shown in FIG. 2. When the vehicle has reached the fully lifted position, the valve 81 is returned to the position shown in FIG. 6 and the vehicle is retained with its rear end elevated on the spare wheel 52 and the rear wheels 23 off the pavement.

The gear is now engaged with the gear 70 and the pinion shaft 71, by movement of the shift fork 73, heretofore described. By placing the car shift in low gear, the pinion shaft 71 will be rotated clockwise, as viewed in FIG. 5. The horizontal chain 65 will then be driven to rotate the sprocket 64 counter-clockwise, as viewed from the rear of the vehicle. The vertical chain 61 travels to rotate the shaft 58 counterclockwise. The sprocket 57 then moves the chain 56 to rotate the sprocket 55, the hub 54, and the wheel 52 counter-clockwise, to swing the rear of the vehicle to the left as viewed in FIG. 5 or to the right as viewed in FIGS. 1 and 2, or towards the curb when parked at the right of the roadway. During rotation of the wheel 52 with the vehicle supported by the wheel 52, the rear wheels 23 will be rotating off the ground, and application of the brakes will stop the wheels 23, the axles 22 and 53, the pinion shaft 71, the train of chains 65, 61, and 56, and the wheel 52. Placing the car in reverse and applying power rotates the pinion shaft 71 and all the chains 65, 61, and 56 and the sprockets 64, 57, and 55 that drive the wheel 52 in the opposite direction to cause the vehicle to swing to the left, as viewed in FIGS. 1 and 2, or to the right as viewed in FIG. 5. The braking of the wheels 23 or the drive shaft for the pinion shaft 71 and the gear 70 again brakes the spare wheel 52 in the manner just described.

The piston and rod 72a of cylinder 72 are anchored at its right end (as viewed in FIG. 4) to the cross member of frame 77. Cylinder 72 moves relative to its piston rod 72a and piston so that bell crank 73 moves (due to the connection between the moving cylinder and the upper left end of bell crank 73) clockwise when fluid under pressure enters pipe 75 (at the same time it enters through pipe 75 of FIG. 1 to lower the spare 52 to lift the rear of the car) to cause combination gear and sprocket 67 to move into driving engagement with gear 70.

When the parking, lifting, or turning operation is complete and it is desired to retract the spare wheel 52, rotation of the valve shaft 81 counterclockwise will cause fluid pressure to go through the line 76 to the lower end of the cylinder 42 to retract the piston rod 46 (and go through the line 76ª to the cylinder 72 to disengage the gear 67). This will cause the toggle formed by the upper end of the arm 40 and the link 41 to fold from the position shown in FIG. 2 to the retracted position shown in FIG. 1 where the latch formed by members 82 and 83 will hold the mechanism up, with the aid of the fluid pressure locked in the lower end of the cylinder 42 by a valve 85 when the shaft 81 has been returned to the position shown in FIG. 6 at the completion of the lifting cycle.

When it is desired to remove a rear wheel 23 because of a flat tire, etc., a pin 86 (carried with the wheel wrench or in a block 87 when not needed) is inserted in hole 88 of the guide bracket 39 before lowering the spare tire 52$^a$, as shown in FIG. 10. The spare tire 52$^a$ is removed in the normal manner from the hub 53 (in the position of FIG. 1 where the spare wheel is raised), and the block 87 is attached to a shoe 84 at the lower end of the arm 40. The mechanism is then lowered to the position shown in FIG. 10. The hook 34 is now prevented from engaging the boss 32 by the pin 86 in the hole 88, and the mechanism acting through the block 87 lifts the frame 20 by a boss 89 on the arm 34 engaging a portion of the guide 39 on the right hand limit of the slot formed by the guide 39, so that the wheels 23 hang on the springs 21. This is the only circumstance in which the boss 89 engages the guide 39. The wheels 23 will clear fenders 90 so that one of the wheels 23 can be removed and replaced by the spare tire 52$^a$. The flat tire from the wheel 23 can be placed on the block 87 and the hub 54 (after raising the hub 54, removing the pin 86 from the hole 88) for transporting the flat to be repaired. However, the car cannot be moved sidewise on the flat spare until it has been repaired, as the shoe 84 will normally rest on the ground when the spare tire 52$^a$ is flat.

When the mechanism is held in the inactive position, the boss 83 on the cross tube 26 engages the catch 82 on the arm 40, which is then in the fully retracted position, due to the pull of the piston rod 46. When the fluid in the cylinder 42 causes the piston rod 46 to push on the pin 47, in order to lower the mechanism and spare, the force applied on the arm 40 disengages the catch 82 from the boss 83 by the clockwise rotation of the walking beam arm 40 about its pivot 47$^a$.

In FIGS. 6 and 7 I show a hydraulic circuit that can be used with the invention. A fluid pump 91 is driven by the engine (not shown) in the same manner as the power steering pumps now used in high production motor cars, or as shown in the service manual for 1952 Cadillacs. The outlet chamber from the pump rotor is shown at 92. The balance of the pump 91 and its drive are not shown, as it is a conventional pump like that used for power steering on many cars, such as that described in the service manual for 1952 Cadillacs.

An orifice passage 93 connects the high pressure chamber 92 with a chamber 94. The drop in unit pressure of the liquid in passing from the chamber 92 to the chamber 94 acts on a constant flow valve 95, because the chamber 94 is connected to the rear of the valve 95 by a port 96. The enlarged flange 97 on the valve 95 limits its motion to the right, as viewed in FIG. 6, while a flat portion 98 allows the pressure in a chamber 100 to act on both sides of flange 97 and therefore on the same area of the valve 95 that the pressure from the chamber 92 acts on at the other end of the valve 95. A spring 101 retained by a plug 111 rides on a guide 102 and urges the flow valve 95 to the right, as viewed in FIG. 6, against the flange 97. When the unit pressure drop between the chamber 92 and chamber 94 overcomes the action of the spring 101, the valve 95 moves to the left and uncovers a port 103, which leads to an inlet chamber 104 and thence to the pump intake via a port 105. The higher pressure on the right side of valve 95 moves valve 95 toward the lower pressure or toward the left (as viewed in FIG. 6) against the action of spring 101. The lower pressure in area or chamber 94 and area or chamber 100 at the left of valve 95 causes this motion of valve 95 to the left to uncover the slot 103$a$ to the right of the bottom of opening 103 which then connects chamber 92 and the area to the right of valve 95 to port 103$a$, hole 103, to chamber 104 which is connected to the intake to the pump and therefore causes valve 95 to act as a flow control valve to maintain the discharge of the pump constant as long as the area of port 93 remains unchanged. When port 93 is enlarged by moving valve 106 to the right (as viewed in FIG. 6) more oil must be pumped through the larger orifice to create the pressure drop between chamber 92 and chamber 100 to cause flow control valve 95 to limit the constant flow to a higher value with a larger opening at area 93 than with a small area at area 93.

A valve 106 covers and uncovers a seat 107 leading to the passage 93 and is mounted on valve stem 108. The stem 108 has a valve stem guide member 109 and a fluid seal 110. A safety valve 112 and its associated spring 112$^a$ limit the maximum unit pressure in the chamber 94 and its connected passageways.

The control shaft 81 for the four-way open-center valve 85 has a collar 113 which carries three ears 114, 115, and 116 respectively. When the shaft 81 is in the neutral position, as shown in FIG. 6, oil flows from the pump rotor to the chamber 92, the passage 93, the chamber 94, and inside an extension 117 to a fitting 118. From the fitting 118 it flows via a pipe 119 to the open center of the valve 85, whence it flows out a pipe 120, through a power steering valve and cylinder 121, into a line 122. It flows thence via one branch line 123 to a reservoir 124, and via another branch line 125 to the intake chamber 104 of the pump housing, whence it flows through the port 105 to the intake of the pump.

To prevent accidental lowering of the vehicle raising and traversing device while the vehicle is in motion down the road, I use a hydraulic foot-brake lock out, such as is illustrated in FIG. 6. When a foot pedal 130$^a$ is depressed, fluid from the foot brake master cylinder 130$^b$ of a hydraulic brake system 130$^c$ having a brake 130$^d$, goes through a pipe 130 to a cylinder 131 to actuate a piston 132 which abuts against the spring-loaded lock arm 80, the upper end of which engages the ear 116 to prevent clockwise rotation of the valve shaft 81 into the tire-lowering position, until the foot brake is set. When the foot brake is firmly set, it unlocks the arm 80, pushing its upper end against a stop 133, so that the valve shaft 81 can rotate clockwise, after which pressure flows from the line 119 to the lines 75 and 75$^a$ to actuate the cylinders 42 and 72, which, respectively, lift the car on the wheel 52 and engage the gears 67 and 70.

The return lines 76 and 76$^a$ from the cylinders 42 and 72 return the fluid to the open center valve 85 where it is valved to flow out through the line 120 through the power steering valve and cylinder 121 and line 122 to reservoir 124 and chamber 104 as described above. When the valve shaft 81 is rotated counterclockwise from the position shown, oil flows from the line 119 through the lines 76 and 76$^a$ to the opposite ends of the cylinders 42 and 72 from those connected to the lines 75 and 75$^a$. Oil also flows back through the lines 75 and 75$^a$, the valve 85, out the line 120, through the power steering 121, to the reservoir 124 and chamber 104.

At the same time that the valve shaft 81 is rotated either way, ears 114 and 115 engage ears 136 and 137 of an arm 138 to move the arm 138 to the left, as viewed in FIG. 6, rotating an arm 140 clockwise through a pivotal connecting pin 141. The arm 141 is pivoted at a pin 142 on an extension member 143 and acts to move the valve 106 to open a larger orifice during the time the cylinder 42 is being actuated in either direction. When the valve 106 opens the orifice, it provides a larger constant-quantity discharge, as more volume of fluid must flow past the enlarged orifice to get enough drop to operate the constant-flow valve 95. Thus, for example, for normal power steering, the flow valve controls the pump discharge through the line 119 to approximately 1.7 gallons per minute while such discharge is raised to 2.5 to 4 gallons per minute when the valve shaft 81 is rotated either right or left from the position shown. This provides faster car lift and faster fifth-wheel retraction than if limited to normal power steering pump discharges.

In FIG. 7 I have shown another hydraulic circuit that can be used with the invention. In this construction, a power-steering unit 150 is supplied with pressure from the pump 91, and a circuit is provided for operating the parking device in a somewhat different manner. The cylinder 151 is used to lower the spare tire 52ᵃ like the cylinder 42, except that it is shown as a single-acting cylinder with a spring 174 return. Likewise, the cylinder 72 is a one-way cylinder to engage the gears 67 and 70, when the vehicle is raised on the spare tire 52ᵃ, and the gears 67 and 70 disengaged by a spring 152 when there is no lifting pressure in the upper end 153 of the cylinder 151. When there is pressure in the upper end 153 of the cylinder 151, it is transmitted to a cylinder 154 to act on a piston 155 to move a valve rod 156 to the right and to cause a valve 157 to open the passage to the port 93, so that the constant flow valve 95 will control at a higher volume during the vehicle lifting operation.

In FIG. 7 I have shown a different valve 160 for controlling the one-way cylinders 151 and 72. A plunger 161 leaves the pump output line 119 connected to the return line 120 when in the position shown. The car is held in the raised position when the valve is in this position by blocking off a line 162. When the plunger 161 is moved to the right by a control handle 163, control cable 164, and spring 165, a valve element 166 covers a port 167, and the line 119 is connected to the line 162 to cause the cylinder 151 to lift the car on the spare tire. At the same time, an element 170 blocks off a port 171 leading to the line 120.

The handle 163 is bearinged at 172 and held in position by a quadrant 173. When the valve 161 is moved to the left by the handle 163 and the cable 164, the car is held raised, as stated before, in the position shown. When moved further to the left, a spring 174 and the weight of the car retract the piston in the cylinder 151 to retract the spare tire, connecting the line 162 with the port 167 and the line 113ᵃ, the line 113ᵃ being connected to the line 120 by a line 175 between the power steering 150 and the return cavity 104 of the fluid pump.

The spring 152 likewise disengages the gear 68 from the gear 69 in this far left position of the valve plunger 161. At the same time, the output line 119 from the pump is connected to the power steering 150 by the line 120, so that power steering is effective during the retraction of the spare tire 52ᵃ, and the car can be driven with the aid of power steering while the spare wheel 52 is being retracted by the spring 174.

When the car is being raised on the spare, the pump is delivering a higher volume than normal through the operation of the valve 157, which is opened against the spring 174 by the lifting fluid pressure action of the cylinder 151 going through a line 176 to act on the piston 155 in the cylinder 154. Power steering 150 is then by-passed, as power steering is not needed during the car raising operation. Also, there are sometimes restrictions in the power steering valves, etc. that might restrict the speed of lift at high pump volume if the discharge from the back of the cylinders had to go through power steering unit 150, as it goes through the unit 121 in FIG. 6, during the car raising operation. The construction shown in FIG. 7 may be used with the valving and cylinders of FIG. 6, by connecting the cylinder 154 to the car raising line 75 of FIG. 6 so that the pressure to lift the vehicle would cause increased flow from the pump whether single acting cylinders, as shown in FIG. 7, or double acting cylinders, as shown in FIG. 6 are being used.

In FIGS. 8 and 9 I have shown a different type of valve control to get higher volume discharge from the power steering pump during the raising and lowering or hydraulically actuated strokes of the cylinders 151 or 42. FIGS. 8 and 9 show part of a pump 200 which is generally of the type used by many American car manufacturers using power steering since 1952 and as shown and described in the power steering service manual for 1953 Packard motor cars. The pump 200 has a discharge passage or chamber 201 coming from the pump rotor 202. A constant flow valve 203 receives oil under pressure from the chamber 201, which acts on the right-hand end of the valve 203 at a passage 203ᵃ. The passage 203ᵃ admits oil from the right-hand end of FIG. 8. Ports 204 admit oil to the center chamber of the valve 203, which contains a spring 218. From there the oil passes through the open center passage 205 of a pressure relief valve 206 into a passage 207 containing a spring 208, through a perforated retainer 210 into a passage 211 and out a port 212 to the line 119 of FIGS. 6 and 7. The size of this passage through the center of the valve 205 is restricted by a valve 213 mounted on valve stems 214, 215, and 216 respectively. The larger diameter of an end 206ᵃ of the valve 206 allows the pressure relief valve 206 to move against a spring 218 to uncover part or all of a port 220 to discharge part of the fluid into a cavity 221, which is the intake to the pump and is also connected to a reservoir 222 in the conventional manner.

All the construction described so far is substantially conventional, except for the valve 213, as the conventional pump has a control valve operating on the drop in pressure across a fixed area orifice. In this case, the valve 213 causes the orifice in the center of relief valve 206 to be greatly enlarged when fluid pressure from the line 176 enters a passage 224 in a fitting 225 from the line 176 to actuate a piston 226 against a spring 227. The spring 227 abuts against the perforated retainer 210 to force the shaft 214 to the position shown in FIG. 9.

In the position of the valve 213 shown in FIG. 8, the orifice through the valve 206 is large, and a large constant volume discharge will result for rapid raising of the vehicle. With the valve 213 in the position shown in FIG. 9, the discharge of the pump is constant at a lower volume sufficient for power steering. Also, with this construction, when pressure relief valve moves to the right to discharge fluid into a port 230, it will move over the valve 213 and a smaller discharge through the port 212 will result.

The piston 226 has a seal 231 to prevent fluid from a chamber 232 from passing the piston 226, and the piston rod 216 has a seal 233. The area back of the piston 226 is ported by a port 234. The spring 208 urges the constant flow valve 203 to the right against the action of the drop in pressure between the chamber 201, which acts on the right end of the valve 203 through a passage 235 and the reduced pressure after passing the valve 213, which reduced pressure acts on the left end of the valve 203.

From the foregoing it can be seen that I have provided a control that gives a greater discharge from a pump when the vehicle is to be raised or lowered than when the pump is running normally, as when supplying power steering. However, this circuit may be used without power steering and would result in power saving, as only a small amount of fluid would be circulated except when the fluid is needed to operate the vehicle lifting or other similar device. The actuation of the valve 213 of FIGS. 8 and 9 could be by an arm, such as the arm 140 of FIG. 6, rather than the piston 226 as shown.

I do not wish in any way to limit myself to the exact details or mode of operation set forth in the specifications and drawings without departing from the spirit and scope of my invention which is set forth in the following claims.

I claim:

1. A vehicle lifting and traversing device, comprising: a vehicle having a frame with a lateral member at its rear and rear wheels carried by a rear axle; a main arm pivotally supported by said lateral member for swinging movement about a longitudinal axis; a spare wheel carried rotatably by said main arm and raised and lowered relative to said frame by the pivotal movement of said main arm; a rigid arm pivotally mounted to said main arm; hydraulic apparatus including a cylinder and a piston with a rod, said apparatus being pivotally mounted to said main arm at one end and to said rigid arm at the other end and having power means for moving said piston in said cylinder; a hooked arm pivotally connected to said rigid arm at a position remote from the connection of said rigid arm to said apparatus, guide means on said lateral member for guiding said hooked arm for movement vertically when said rigid arm is moved; and axle-supported means adapted to be engaged and disengaged by said hooked arm, depending on the position of said rigid arm.

2. A vehicle lifting and traversing device, comprising: a vehicle having a frame with a lateral member at its rear, rear wheels carried by a rear axle, a resilient connection between said rear axle and said frame and an engine transmission carried by said rear axle; a main arm pivotally supported at one end by said lateral member for swinging movement about a longitudinal axis; a spare wheel carried rotatably and vertically by the other end of said main arm and adapted to be raised and lowered relative to said frame by the pivotal movement thereof; a rigid arm pivotally mounted to said main arm adjacent said spare wheel; hydraulic apparatus including a cylinder and a piston with a rod, one being pivotally mounted to said main arm and the other pivotally mounted to said rigid arm, and power means for moving said piston in said cylinder; a hooked arm connected to said rigid arm by means forming a toggle connection between said hooked arm and said main arm; axle-supported means adapted to be engaged and disengaged by said hooked arm, depending on the position of said rigid arm determined by said hydraulic power means; and means connected to said transmission for rotating said spare wheel when it is in contact with the ground.

3. The device of claim 2 whereby said means connected to said transmission for rotating said spare wheel when it is in contact with the ground includes means actuated by said hydraulic power means for engaging and disengaging the connection to said transmission.

4. The device of claim 2, including brake means, lockout means for preventing said power means from actuating said piston unless said brake means is applied, and lockout release means actuated by said brake means when said brake means is applied for releasing said lockout means and enabling operation of said piston by said power means.

5. A vehicle lifting and traversing device, comprising: a vehicle having a frame with a lateral member at its rear having first catch means; rear wheels carried by a rear axle; a resilient connection between said rear axle and said frame; an engine transmission carried by said rear axle; a main arm pivotally supported at one end by said lateral member for swinging movement about a longitudinal axis; a spare wheel carried rotatably and vertically by the other end of said main arm and adapted to be raised and lowered relative to said frame by the pivotal movement thereof; a rigid arm pivotally mounted to said main arm adjacent said spare wheel and having second catch means adapted to be engaged against said first catch means to lock said rigid arm releasably in an elevated position, said rigid arm also having an upper end; hydraulic apparatus including a cylinder pivotally mounted to said main arm, a piston with a rod pivotally mounted to a portion of said rigid arm below its said pivot, and power means for moving said piston in said cylinder; a hooked arm linked to the upper end of said rigid arm; guide means on said frame for causing said hooked arm to be moved vertically by movement of said rigid arm; axle-supported means adapted to be engaged and disengaged by said hooked arm, depending on the position of said rigid arm determined by said hydraulic power means; and means connected to said transmission for rotating said spare wheel when it is in contact with the ground.

6. In a vehicle having a frame, rear wheels carried by a rear axle, a resilient connection between said rear axle and said frame, an engine, and a transmission, a vehicle lifting and traversing device comprising: a cross member rigidly supported by and extending laterally of said frame; a main arm pivotally supported at one end by said cross member for swinging movement about a longitudinal axis and having a spindle at its other end; a spare wheel carried in vertical position by said spindle, and adapted to be raised and lowered relative to said frame by pivotal movement of said main arm; a rigid arm pivotally mounted to said main arm adjacent said spindle and having an upper end; hydraulic apparatus including a cylinder and a piston with a rod, one pivotally mounted to said main arm, the other pivotally mounted to said rigid arm, and power means for moving said piston in said cylinder; a hooked arm having an upper end linked to the upper end of said rigid arm; means rigidly supported by said axle adapted to be engaged and disengaged by said hooked arm; a driving connection between said transmission and said spare wheel for rotating said spare wheel when it is in contact with the ground, and a shift operated by said power means for engaging and disengaging the driving connection between said transmission and said spare wheel.

7. In a vehicle having a frame, rear wheels carried by a rear axle, a resilient connection between said rear axle and said frame, an engine, and a transmission, a vehicle lifting and traversing device comprising: a cross member rigidly supported by and extending laterally of said frame, having first catch means thereon and a guide bracket providing a guideway; a main arm pivotally supported at one end by said cross member for swinging movement about a longitudinal axis and having a spindle at its other end; a spare wheel carried in vertical position by said spindle, and adapted to be raised and lowered relative to said frame by pivotal movement of said main arm; a rigid arm pivotally mounted to said main arm by a pivot adjacent said spindle, there being second catch means on said rigid arm adapted to be engaged against said first catch means to lock said rigid arm in an elevated position when said spare wheel is elevated, said rigid arm also having an upper end; hydraulic apparatus including a cylinder pivotally mounted by a pivot to said main arm, a piston with a rod pivotally mounted adjacent to a portion of said rigid arm below said pivot that connects said rigid arm to said main arm, and power means for moving said piston in said cylinder; a hooked arm extending vertically through said guideway and having an upper end linked to the upper end of said rigid arm; means rigidly supported by said axle adapted to be engaged and disengaged by said hooked arm; and means operated by said transmission for rotating said spare wheel when it is in contact with the ground.

8. In a vehicle having a frame, rear wheels carried by a rear axle, a resilient connection between said rear axle and said frame, brakes for said wheels, an engine, and a transmission, a vehicle lifting and traversing device comprising: a cross member rigidly supported by and extending laterally of said frame, having first catch means thereon and a guide bracket providing a guideway; a main arm pivotally supported at one end by said cross member for swinging movement about a longitudinal axis and having a spindle at its other end; a spare wheel carried in vertical position by said spindle, and adapted to be raised and lowered relative to said frame by pivotal movement of said main arm; a rigid arm pivotally mounted to said main arm by a pivot adjacent said spindle, said rigid arm having second catch means adapted to be engaged against said first catch means to lock said rigid arm in an elevated position when said spare wheel is elevated, said rigid arm also having an upper end; hydraulic apparatus including a cylinder pivotally mounted to said main arm, a piston with a rod pivotally mounted adjacent to a portion of said rigid arm below said pivot adjacent said spindle, an engine-driven pump for moving said piston in said cylinder; lockout means normally preventing said pump from moving said piston, and release means for said lockout means operated by application of said brakes; a hooked arm extending vertically through said guideway and having an upper end linked to the upper end of said rigid arm; means rigidly supported by said axle adapted to be engaged and disengaged by said hooked arm; means engageable with said transmission for rotating said spare wheel when it is in contact with the ground; and shift means operated by said pump when said release means is actuated for engaging said power-transmission means with said transmission and for normally disengaging them when said lockout means is locked.

9. A vehicle lifting and traversing device, comprising: a vehicle having a frame, a rear axle with a differential housing, rear wheels carried by said rear axle, and a resilient connection between said rear axle and said frame; an inclined cross member rigidly supported by and extending laterally of said frame, having first catch means thereon and a guide bracket providing a guideway; a main arm pivotally supported at its inboard end by said cross member for swinging movement about a longitudinal axis and having a spindle at its outboard end; a spare wheel carried in vertical position by said spindle and adapted to be raised and lowered relative to said frame by rotational movement of said main arm about its pivot; a truss-like rigid arm pivotally mounted to said main arm adjacent said spindle and having a lower end with a ground-engageable shoe thereon, second catch means on said rigid arm adapted to be engaged against said first catch means to lock said rigid arm in an elevated position when said spare wheel is elevated, and said rigid arm having an upper end; hydraulic apparatus including a cylinder pivotally mounted to said main arm, a piston, and a piston rod pivotally mounted adjacent the lower end of said truss-like arm, and power means for moving said piston in said cylinder; a hooked arm having a hook at its lower end, extending vertically through said guideway and having an upper end thereabove; a boss on said differential housing adapted to be engaged and disengaged by said hook; a radius rod pivotally mounted at one end to said cross member and at its other end to said hooked arm in between its ends; a link pivotally attached to the upper end of said hooked arm and pivotally attached to the upper end of said truss-like arm; and transmission means for rotating said spare wheel when it is in contact with the ground.

10. A vehicle including a body, rear wheels, mechanism on which said rear wheels are mounted, resilient means, said rear wheels supporting the rear portion of said body through said resilient means, a vehicle lifting and traversing device carried by said vehicle, said lifting and traversing device including a ground contacting traversing wheel, means connecting said device to said body for movement therewith as sprung weight rather than with said mechanism on which said rear wheels are mounted, a drive shaft for said vehicle, a differential, a pinion shaft, a drive for said traversing wheel including a driving contact with said pinion shaft which moves up and down with said pinion shaft as opposed to the up and down motion of said body adjacent said pinion shaft, said drive for said traversing wheel including a rotating shaft carried by said body and drive means from said last-mentioned shaft to said traversing wheel supported by said lifting and traversing device, so that when the rear of the vehicle is supported on said traversing wheel said drive means will drive said traversing wheel even when traversing rough terrain, means for supporting said traversing wheel for movement vertically relative to said body when in said vehicle supporting position, and means for also supporting said mechanism on which said rear wheels rotate for movement vertically with said traversing wheel when traversing rough terrain rather than with said body.

11. A vehicle including a body, rear wheels, a differential housing, a mechanism on which said rear wheels and said differential housing are mounted, resilient means connected to said mechanism and to said body so that said rear wheels support the rear portion of said body through said resilient means, a vehicle lifting and traversing device carried by said vehicle, said lifting and traversing device including a ground contacting traversing wheel, means connecting said wheel to said body for movement therewith as sprung weight rather than with said mechanism on which said rear wheels are mounted, a drive for said traversing wheel including a pair of chains and four sprockets, shaft means for carrying two of said sprockets for movement together, one of the other said sprockets being rotatably supported on said differential housing, another of said other sprockets being mounted on said body as sprung weight, and radius rods attaching said two sprockets that move together to the other two sprockets to keep said chains in adjustment.

12. A vehicle including a body, rear wheels, mechanism on which said rear wheels are mounted, resilient means, said rear wheels and said mechanism supporting the rear portion of said body through said resilient means, a differential supported by said mechanism, a vehicle lifting and traversing device carried by said vehicle, said lifting and traversing device including a ground contacting traversing wheel mounted for movement with said body as sprung weight rather than with said mechanism, means for driving said traversing wheel from said differential and including a pair of endless flexible means each supported by two rotating members, a common shaft supporting one rotating member of each of said endless flexible means, and separate shafts for each of the other rotating members, one said separate shaft being supported by said mechanism and the other supported by said body, said common shaft being supported pivotally by both said body and said mechanism at a constant radius from each, and means for moving said common shaft and separate shafts relative to each other to provide a knee joint drive between the unsprung shaft and the shaft that is spring-supported with said body, said traversing wheel moving with said body in its vehicle traversing position and being driven by said knee joint drive.

13. A vehicle lifting and traversing device, comprising a vehicle having a frame with a lateral member at its rear end and rear wheels carried by a rear axle; a rigid main arm pivotally supported by said lateral member for swinging about a longitudinal axis; a spare wheel carried rotatably on said main arm in a normally elevated position and adapted to be moved thereby into contact with the ground; a single hooked arm joined to said main arm by a direct toggle connection; axle-supported means adapted for engagement by said hooked arm for lifting said axle relative to said frame; latch means on said toggle connection and said frame for locking said toggle to said frame when said spare wheel is elevated above the ground; and power means for simultaneously raising one end of the vehicle on said spare wheel and moving said hooked arm by its toggle connection.

14. A vehicle lifting and traversing device, comprising a vehicle having a frame with a lateral member at its rear end and rear wheels carried by a rear axle; a brake for said rear wheels; a rigid main arm pivotally supported by said lateral member for swinging about a longitudinal axis; a spare wheel carried rotatably on said main arm in a normally elevated position and adapted to be moved thereby into contact with the ground; a single hooked arm joined to said main arm by a direct toggle connection; axle-supported means adapted for engagement by said hooked arm for lifting said axle relative to said frame; power means for simultaneously raising one end of the vehicle on said spare wheel and moving said hooked arm by its toggle connection; a lockout means normally preventing lowering of said spare wheel; means unlocking said lockout means when said brake is applied, whereby said spare wheel can be lowered into ground contact only when said brake is applied; and means preventing the application of said lockout means when said spare wheel is lowered, so that said spare wheel can be raised at any time.

15. For use with a vehicle lifting and traversing device comprising a vehicle having a frame with a lateral member at its rear end and rear wheels carried by a rear axle, a rigid main arm pivotally supported by said lateral member for swinging about a longitudinal axis, a spare wheel carried rotatably on said main arm in a normally elevated position and adapted to be moved thereby into contact with the ground, a single hooked arm joined to said main arm by a direct toggle connection, axle-supported means adapted for engagement by said hooked arm for lifting said axle relative to said frame, and power means for simultaneously raising one end of the vehicle on said spare wheel and moving said hooked arm by its toggle connection; an accessory enabling the use of said device to raise the rear wheels off the ground while changing one of said wheels, comprising a removable extension on said toggle connection providing a ground-engageable shoe end and removable means for engaging said hooked arm and said frame for locking said hooked arm against movement relative to said frame.

16. A wheeled vehicle including a power plant, a driver's compartment, a foot-brake pedal, a hydraulic brake system for said wheels selectively energized by said pedal, lifting device means operated by the power plant actuating the vehicle into lifted position and into retracted position and including control means selectively effecting actuation of the lifting device into either of said positions, lockout means associated with and at a fixed location adjacent to said control means normally preventing operation of the control means for effecting actuation of the lifting device to vehicle lifted position but inoperative to prevent operation of the control means for effecting actuation of the lifting device to retracted position, and means actuated by the hydraulic system upon increase in pressure thereof in response to energization by the brake pedal to brake the wheels and acting against the lockout means to render it ineffective to prevent operation of the control means.

References Cited in the file of this patent

UNITED STATES PATENTS

| | | |
|---|---|---|
| 1,884,933 | Walker | Oct. 25, 1932 |
| 1,888,149 | Truran | Nov. 15, 1932 |
| 1,948,043 | Moffat | Feb. 20, 1934 |
| 1,990,150 | Walker | Feb. 5, 1935 |
| 2,005,173 | Walker | June 18, 1935 |
| 2,054,842 | Walker | Sept. 22, 1936 |
| 2,136,570 | Walker | Nov. 15, 1938 |
| 2,139,341 | Walker | Dec. 6, 1938 |
| 2,322,740 | Vanderzee et al. | June 22, 1943 |
| 2,331,026 | Harrington | Oct. 5, 1943 |
| 2,638,995 | Gottlieb | May 19, 1953 |
| 2,746,554 | Matthews | May 22, 1956 |